United States Patent

Shelby

[15] 3,682,135

[45] Aug. 8, 1972

[54] SHIELDING APPARATUS FOR PLASTIC ARTICLES

[72] Inventor: Richard K. Shelby, Chicago, Ill.

[73] Assignee: Monsanto Company, St. Louis, Mo.

[22] Filed: Feb. 27, 1968

[21] Appl. No.: 708,587

Related U.S. Application Data

[63] Continuation-in-part of Ser. No. 380,212, July 6, 1964, abandoned.

[52] U.S. Cl. ................................................118/503
[51] Int. Cl. ............................................B05c 11/14
[58] Field of Search......118/425, 504, 505, 503, 406; 269/285; 279/102; 215/100.5; 311/64

[56] References Cited

UNITED STATES PATENTS

| 1,422,964 | 7/1922 | Greenbaum | 118/500 |
| 1,991,118 | 2/1935 | Raiche | 425/272 |
| 2,359,977 | 10/1944 | Duggan | 118/505 |
| 2,363,846 | 11/1944 | Dugan | 118/505 |
| 2,371,859 | 3/1945 | Wallace | 118/505 |
| 2,401,415 | 6/1946 | Duggan | 204/297 |
| 2,126,501 | 8/1938 | Puderbaugh | 118/505 |
| 2,570,954 | 10/1951 | Kasman | 215/100.5 |
| 2,646,769 | 7/1953 | Lindsay | 118/11 |
| 2,748,952 | 6/1956 | Fleit et al. | 211/74 |
| 3,414,502 | 12/1968 | Porrata et al. | 204/281 |

FOREIGN PATENTS OR APPLICATIONS

378,152  1/1940  Italy

*Primary Examiner*—Morris Kaplan
*Attorney*—Michael J. Murphy, James C. Logomasini and Herbert B. Roberts

[57] ABSTRACT

Article manipulating means for a dip-coating operation includes a cup like holder. The holder has an inturned flange at the mouth thereof which fucntions to both grip and mask the article to be coated.

1 Claim, 3 Drawing Figures

PATENTED AUG 8 1972  3,682,135
SHEET 1 OF 2
FIG. I
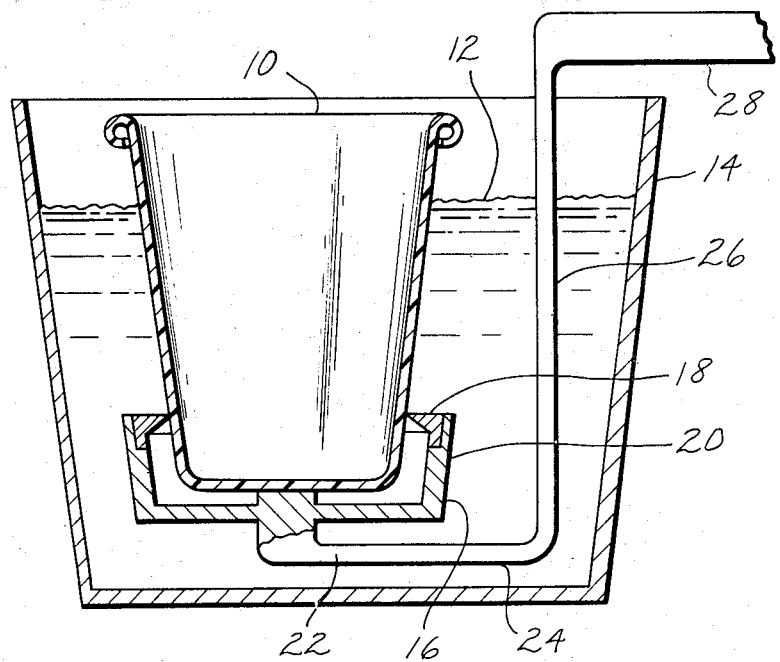
FIG. II
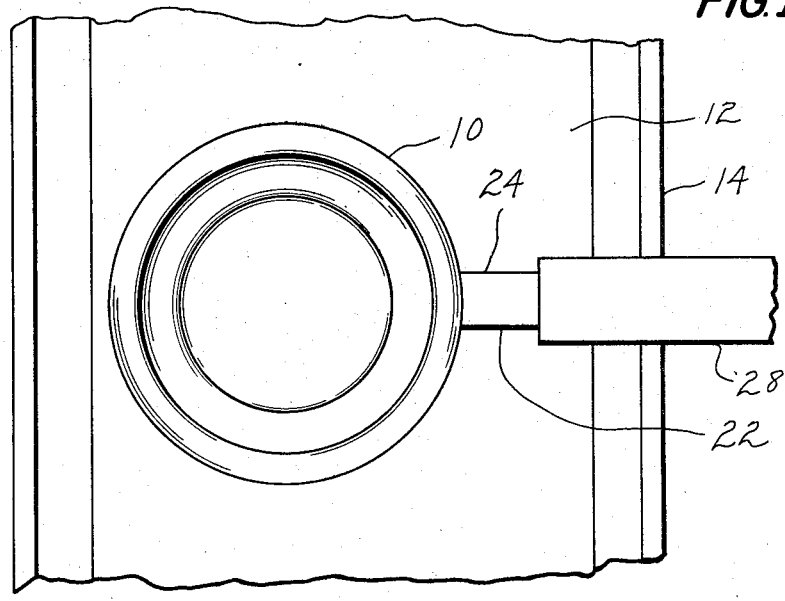
INVENTOR.
RICHARD K. SHELBY
BY Michael J. Murphy
ATTORNEY:

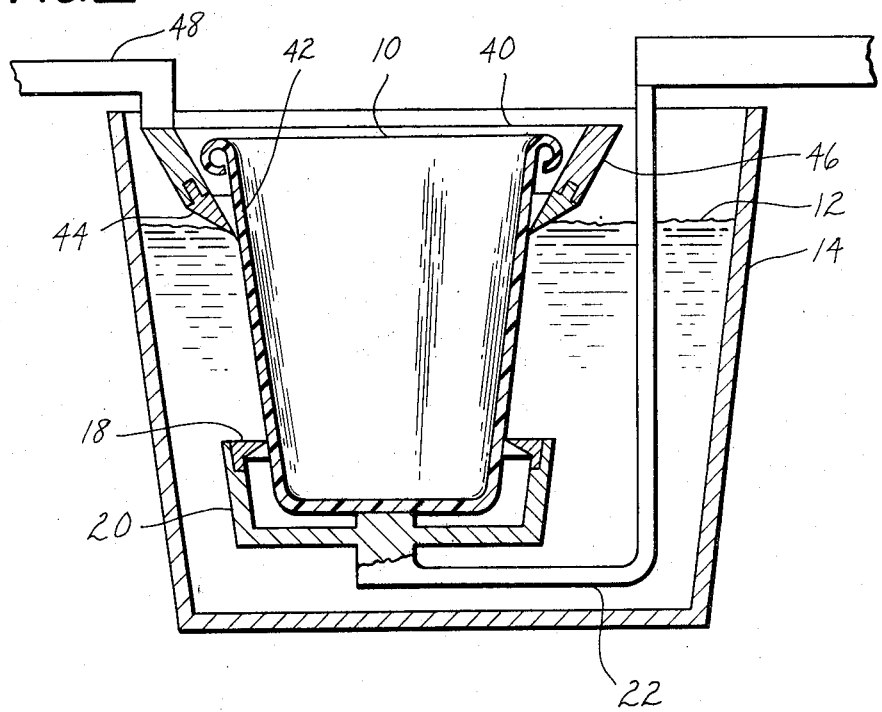
FIG. III
INVENTOR
RICHARD K. SHELBY

SHIELDING APPARATUS FOR PLASTIC ARTICLES

This application is a continuation-in-part of copending application Ser. No. 380,212, filed July 6, 1964 and now abandoned.

The present invention relates to plastic articles of manufacture and more particularly to plastic articles of manufacture having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involved adhering or bonding solid or rigid members to the foam. However, these structures are generally difficult and expensive to construct and are sometimes limited in their application depending on the effectiveness of the bonding operation and the difficulty of preserving the foam intact.

In U.S. Pat. No. 3,262,625, there is described the formation of plastic articles which combine the insulating characteristics of foamed resin and the structural stability and strength of non-foamed plastic. In brief, these plastic articles are produced by steeping a plastic article in a medium which is absorbable by the plastic for a predetermined interval of time, removing the plastic article from the medium and finally heating the plastic article to produce a foamed cover. In this manner, plastic articles such as containers, conduits, etc. are obtained which have good insulating and structural characteristics. Unfortunately, serious problems have been encountered when attempting to control the extent of the area or surface on the plastic article to be foamed. This is primarily due to the difficulty of controlling the area extent of medium contact with the plastic article particularly at high speed production operations.

Accordingly, it is a principal object of the present invention to foam predetermined surface areas on plastic articles.

Another object of the present invention is to foam predetermined surface areas on plastic articles at high speed production rates.

A further object of the present invention is to control the extent of the foamed surface area on plastic articles produced by exposing the plastic to a medium which is absorbable by the plastic and subsequently heating.

A further object of this invention is to provide means to attain the preceding objects.

Other objects of this invention will in part be obvious and will in part appear hereinafter.

These and other objects are attained with an apparatus for selectively foaming predetermined surface areas on a plastic article of manufacture which comprises mechanical sealing means designed to segregate surface portions of the article, thereby preventing a medium in which the plastic article is partially immersed from leaking past the mechanical sealing means. After immersion, foaming occurs by subjecting the plastic article to a source of heat. The medium which is absorbable by the plastic is considered to be any material which is (1) absorbable by the plastic being processed and (2) convertible to a gaseous state at a temperature below the melting point temperature of the plastic. The sealing member is preferably a sharp edged, flexible, reusable, non-tacky material.

The following drawings are provided for the purpose of illustrating various embodiments of the present invention.

FIG. I is a side view, partly in section and with parts broken, illustrating an embodiment of the present invention wherein the lower portion of a container is segregated from the upper portion of the container by a rather sharp edged annularly shaped seal.

FIG. II is a top view, partly in section and with parts broken, of the same embodiment shown in FIG. I.

FIG. III is a side view, partly in section and with parts broken, illustrating a sealing arrangement to segregate both bottom and top portions of a container.

Referring in detail to the figures of the drawings and more specifically FIG. I, there is schematically shown a container 10 substantially submerged in a medium 12 contained within a longitudinally extending tank 14. FIG. II more clearly shows the longitudinal design of tank 14. The medium 12 is a liquid which is absorbable by the plastic and convertible to a gaseous state at a temperature below the melting point temperature of the plastic. Gripping the outer surface of the lower portion of container 10 in a compressive manner is a mechanical sealing device 16 which comprises a sealing member 18 attached to the peripheral edge of a socket member 20. The sealing device 16 is attached to support means 22 which includes a horizontally disposed arm 24 connected to the bottom of the socket member 20, a vertical shaft 26 extending up and out of tank 14 connected at its lower end to the horizontal arm 24, and a partially shown horizontally disposed rod 28 which is attached to the upper end of the vertical shaft 26. The sealing member 18 which is attached peripherally to the socket member 20 is a reusable, non-tacky, flexible ring-shaped material preferably with sharp edges extending radially inward to provide intimate line contact with the outer wall of the container 10. In this manner, the lower portion of the cup is effectively shielded or sealed off from contact with the medium 12 which is confined in the tank 14. The contacting edges of sealing member 18 should lie between about 1/32 – 5/16 inch in width in order to obtain a tight, line type of contact with the plastic cup surface.

In operation, the mechanical sealing device 16 moves into and through the longitudinally extending tank 12 by moving means not shown acting through the support means 22. At the initiation of the process, a container 10 is inserted into the socket member 20 intimately contacting the rather sharp annular edge of the sealing member 18. The support means 22 then moves or sweeps the sealing device and attached container into, through and out of the longitudinally extending tank 14 such that a substantial portion of the outer surface of container 10 is exposed to medium 12 for approximately 10 seconds.

FIG. III illustrates an embodiment similar to that shown in FIG. I except that a second sealing device 40 is provided to segregate the upper surface portion 42 of the container 10. This second sealing device 40 comprises a sealing member 44 attached to the inner peripheral edge of a frustroconical shaped disc 46 and is connected to support means 48 which extends up and out of the tank 14. The sealing member 44 is similar to the previously described sealing member 18 in that it is attached to the inner peripheral edge of the disc 46 and is a reusable, non-tacky, flexible ring-shaped material preferably with sharp edges extending radially inward to provide intimate contact with the outer wall of the container 10. In this manner, the upper portion of the cup is shielded or sealed off from the medium 12 which is confined in the tank 14. The disc 46 extends outwardly and upwardly in a frustoconical manner to reduce the tendency of the medium 12 to splash up and against any portion of the upper shielded container surface.

The operation of the embodiment shown in FIG. III is the same as that shown in FIG. I except that the container 10 is inserted down through the upper sealing device 40 before the bottom of the container comes to rest in the socket member 20. The support means 48 of the upper sealing device is then joined to the support means 22 (the joint not being shown) and the entire assembly, i.e., the container with the upper and lower sealing devices moves into, through and out of the longitudinally extending tank 14 such that the portion of the outer surface of the container 10 between the two sealing rings 18 and 44 is exposed to the medium 12 for approximately 10 seconds.

It should be noted in FIGS. I and II that the width of arm 24 as viewed from the top (FIG. II) is substantially wider than the side thickness as shown in FIG. I. This is done to minimize the turbulence within medium 12 as the horizontally disposed arm 24 moves laterally through the tank 14. As a result of the above-described operation, the container has had its outer mid-portion between the upper and lower sealing members in contact with a medium which resulted in some of the medium being absorbed by the plastic. When the container is subsequently heated, the absorbed medium will cause this outer mid-portion to foam. In other words, it is possible to selectively foam a surface of an article of manufacture by segregating portions of the article by mechanical sealing means and then exposing a segregated portion to a medium which is absorbable by the plastic. When the container is subsequently subjected to a heating operation only those surface areas exposed to the medium will foam. Consequently, the present invention provides a means for selectively foaming the surface of plastic articles which is adaptable to high speed production operations.

The above description and particularly the drawings are set forth for the purpose of illustration and not for the purpose of limitation. In the place of containers, almost any plastic article of manufacture which is foamable by the process described in U.S. Pat. No. 3,262,625 may be treated in the same manner to selectively foam portions of a plastic article. It is, of course, obvious that the more irregularly shaped the article is, the more difficult it will be to segregate surface portions. Consequently, the process of the present invention is generally employed to selectively foam articles which are more or less symmetrical in shape. In addition, the sealing devices can be designed and arranged in various other ways to selectively foam almost any portion of a plastic articles's exterior.

In general, the sealing devices which may be employed in the practice of this invention include any mechanical sealing means which is capable of being pressed against the surface of a plastic article of manufacture such that the flow of a medium through the area of applied pressure is substantially eliminated when a substantial portion of the plastic article of manufacture is immersed in the medium. In general, flexible materials are preferred for sealing members particularly those having rather sharp edges. These rather sharp edged flexible materials have been found to be the most effective for sealing off surface portions of plastic articles from leakage of the medium from one surface portion to another. Typical of the materials which find utility as sealing members are polymers or interpolymers based on butadiene, isobutylene, chloroprene, sulfide, ethylene, propylene and higher olefins, urethane and the like. In general, the particular choice of material for the sealing member will depend to some extent on the medium being used. It is preferred that materials be chosen which are least affected by the medium.

The sealing devices may be temporarily attached to the plastic article during the immersion step only or may accompany the plastic article through all the subsequent stages of the partial foaming process. It is sometimes advantageous to retain the sealing devices through the latter stages of the process as support means or they may even serve to further shield the plastic article from the effects of heat if any of the medium has leaked into areas which are not intended to be foamed.

The following example is given to illustrate the invention and is not intended as a limitation thereof. Unless otherwise specified, quantities are mentioned on a weight basis.

EXAMPLE I

Styrene homopolymer having a Staudinger molecular weight of approximately 55,000 is molded from a sheet in the form of a smooth, tapered cup which is approximately 4 inches in height with an average inside cup diameter of 2 ¼ inches. The average thickness of the cup is about 10 mils.

The lower portion of the cup formed by the above-described operation is inserted into the socket member of a sealing device such as shown in FIG. I and the resulting assembly is exposed to a medium by movement through a tank containing Freon (trichlorofluoromethane), maintained at 65° F. The cup is submerged up to within ½ inch of its top peripheral edge for a period of 5 seconds after which the cup and sealing device is withdrawn from the Freon. The cup is then exposed to a temperature of 70° F. for 15 seconds and heated by 250° F. air for a period of 10 seconds.

The resulting cup has a foamed outer surface throughout the area of immersion except at the area shielded by the sealing device. The foamed area has an average depth of about 10 mils which constitutes approximately one-half of the overall thickness of the cup. Further examination of the cup discloses that the overall structural properties of the cup are not seriously altered by the above-described process while at the same time the insulating properties of the cup are increased several fold.

In general, the plastics treated in the practice of this invention are plastic materials which have been fabricated into various shapes and include polymers such as those based on styrene, vinyl halide, vinylidene halide, vinyl acetate, cellulose acetate or butyrate, ethyl cellulose, acrylic acid esters, metacrylic acid esters, acrylonitrile, ethylene, propylene and higher olefins, isobutylene, fluorolefins and chlorofluorolefins, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber modified polystyrene or polystyrene which preferably has incorporated therein a rubber compound grafted onto the molecule.

The medium which is absorbable by the plastic is considered to be any material which is (1) absorbable by the plastic being processed and (2) convertible to a gaseous state at a temperature below the melting point temperature of the plastic. Preferably, the medium will contain or be a solvent for the plastic and may include a nonsolvent to slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to partially foam on the subsequent application of heat.

The choice of the solvent which may be employed will depend primarily on the type of plastic material which is steeped. For example, acetone or methyl ethyl ketone is considered quite suitable for the acrylonitrile-butadiene-styrene copolymers while Freon (trichlorofluoromethane) is less desirable. On the other hand, Freon is considered quite suitable for polystyrene homopolymers and rubber modified interpolymers. When Freon is used as the medium, sealing members composed of polysulfide rubber have been found most suitable. Among the solvents which find application in the present process there may be listed Freon (trichlorofluoromethane), methylene, chloride, acetone, dichloroethylene, xylene, carbon tetrachloride, methyl ethyl ketone, benzol, toluol, chloroform and the like. Among the materials which sometimes find utility as either nonsolvents or solvents depending on the type of plastic, there may be included methanol, ethanol, n-pentane, isopentane, hexane, diethylethylene and the like.

The steeping operation or exposure of the plastic to the medium generally requires only a few seconds depending for the most part on the depth of foam desired, the type of medium employed, and the respective temperatures of the medium and plastic articles. The steeping operation may be effected by any suitable method such as immersion of the plastic article in a liquid medium or even by subjecting the plastic article to vapors in a vessel which may or may not be pressurized.

In general, the plastic article is permitted to dry for short intervals of time prior to the heating or foaming operation. This drying interval allows deeper diffusion and serves to increase the number of cells and decrease their size. This is considered important for good insulating properties. If desired, the drying interval may be accelerated by forced air drafts, moderate heating conditions, etc.

After the drying interval, the plastic article is heated in accordance with the practice of this invention to foam portions of the plastic article at designated areas. The heating means utilized may vary, the final results being affected by the uniformity of heating, rate of heating and temperature level at which it is conducted. The temperature level will, of course, be above the temperature at which the medium converts from a solid or liquid state to a gaseous state. Consequently, any of the fundamental types of heat transfer, i.e., conduction, convection, and radiation may be utilized. For ease of handling, methods depending on convection are generally preferred, that is, the use of a preheated fluid or more preferably a preheated gas circulating within, around or adjacent the plastic article resulting in a heat transfer from the gas to the plastic. In the case of biaxially oriented plastics, it is sometimes desirable to support or fix the sheet dimensionally during the heating operation to avoid loss of orientation.

The products of this invention are formed from plastic materials. The structures which may be fabricated in the practice of this invention are exceptionally useful for applications requiring good insulating characteristics at defined areas and good structural properties. The products formed in the practice of this invention can be most advantageously used in dispensing or vending applications which require stacking arrangements. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup foamed must be rigidly controlled.

It is obvious that many variations may be made in the products and processes set forth above without departing from the spirit and scope of this invention.

What is claimed is:

1. Apparatus for shielding predetermined surface areas on a plastic container to be foamed, said apparatus comprising a sealing device which comprises a socket member adapted to receive a container and a flexible, uninflatable sealing member attached to the peripheral edge of the socket member having a sharp container contacting edge of between 1/32 – 5/16 inch in width, said sealing member being adapted to intimately contact the outer surface of the container only along a line corresponding to said width thereby effectively segregating the portion of the container within the socket member from the portion without, a longitudinally extending tank for holding a foaming agent in which the container is to be immersed and means for sweeping the container when in place in said socket member through said longitudinally extending tank.

* * * * *